(12) United States Patent
Rubottom et al.

(10) Patent No.: US 7,980,203 B1
(45) Date of Patent: Jul. 19, 2011

(54) GLOW IN THE DARK PET STRAP

(76) Inventors: Derek G. Rubottom, San Juan, TX (US); Sarah A. Allen, San Juan, TX (US)

( * ) Notice: Subject to any disclaimer, the term of this patent is extended or adjusted under 35 U.S.C. 154(b) by 447 days.

(21) Appl. No.: 12/269,982

(22) Filed: Nov. 13, 2008

Related U.S. Application Data

(63) Continuation-in-part of application No. 11/670,091, filed on Feb. 1, 2007, now abandoned, which is a continuation-in-part of application No. 11/307,559, filed on Feb. 13, 2006, now abandoned.

(51) Int. Cl.
*A01K 27/00* (2006.01)
(52) U.S. Cl. ......................... 119/858; 119/856
(58) Field of Classification Search .......... 119/856–860, 119/792
See application file for complete search history.

(56) References Cited

U.S. PATENT DOCUMENTS

| | | | |
|---|---|---|---|
| 940,530 A | 11/1908 | Harlow | |
| 2,798,458 A | 8/1956 | Odermatt | |
| 4,895,110 A | 1/1990 | LoCascio | |
| 5,237,448 A | 8/1993 | Spencer et al. | |
| 5,243,457 A | 9/1993 | Spencer | |
| 6,449,815 B1 | 9/2002 | Spiller | |
| 6,807,680 B2 | 10/2004 | Sloot | |
| 6,892,678 B2 | 5/2005 | Cheng | |
| 7,455,418 B1 * | 11/2008 | Graham | 362/103 |

* cited by examiner

*Primary Examiner* — Kimberly S Smith
(74) *Attorney, Agent, or Firm* — Sturm & Fix LLP

(57) ABSTRACT

A pet strap formed of a transparent material, such as plastic or synthetic rubber, with photoluminescent or phosphorescent colored pigment homogeneously dispersed within and incorporated into the elastometric material. The preferred photoluminescent is strontium oxide aluminate or strontium barium aluminate, which emit a yellow-green light. The strap may be disposed to encircle the neck of the pet as a conventional collar with a buckle and strap end retainers. The strap may also be made in various dimensions suitable for pets of all sizes, and may be configured to be trimmed to the desired size. Another embodiment of the pet strap includes a light reversion strip and an underlying or encased fabric reinforcing strip encased within the elastomeric strap adjacent the bottom side of the strap that contacts the pet. The light reversion strip will allow available light to charge the luminescents more proficiently for better performance.

16 Claims, 6 Drawing Sheets

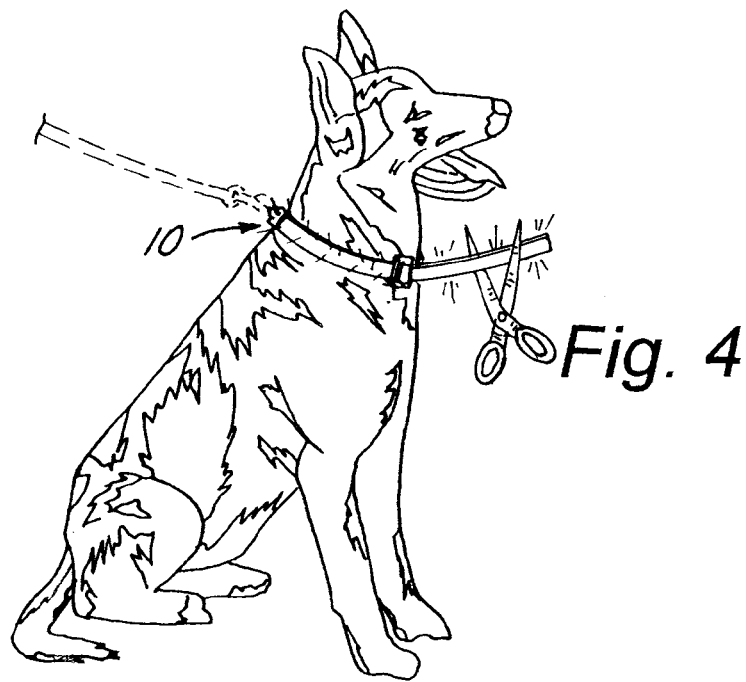
Fig. 4
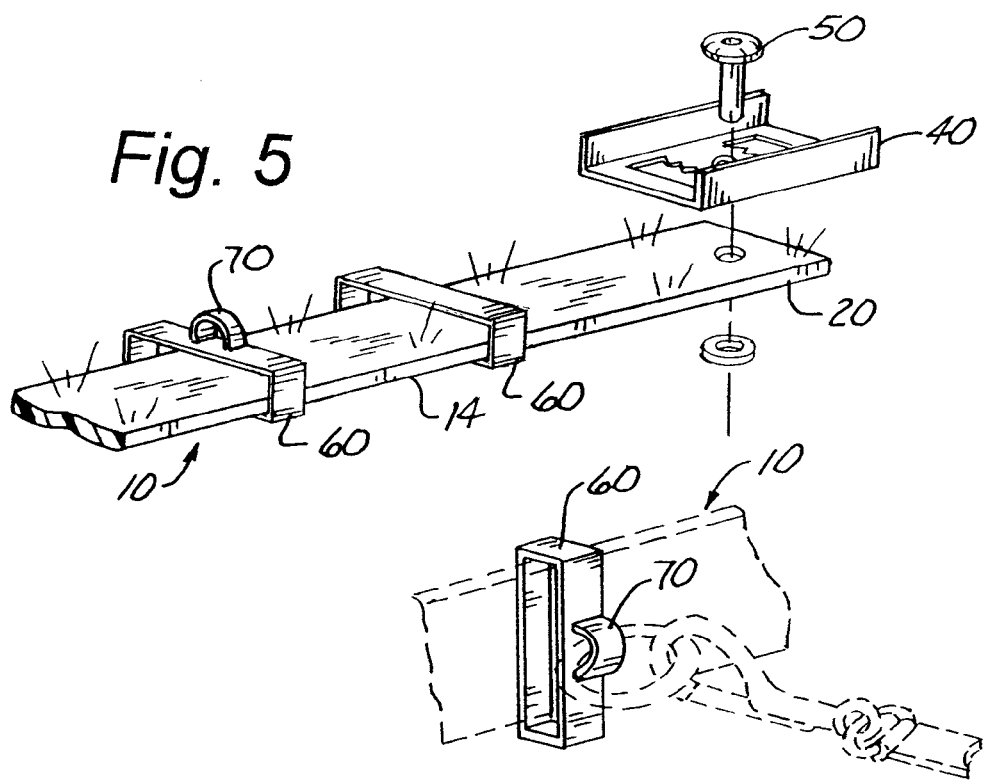
Fig. 5
Fig. 6

GLOW IN THE DARK PET STRAP

CROSS REFERENCE TO RELATED APPLICATIONS

This application is a continuation-in-part of U.S. patent application Ser. No. 11/670,091, filed Feb. 1, 2007, entitled "Glow in the Dark Pet Strap", which is a continuation-in-part of U.S. patent application Ser. No. 11/307,559, filed Feb. 13, 2006, entitled "Glow in the Dark Pet Strap", both of which are incorporated herein by reference.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of pet straps, and more particularly to a pet collar that glows in the dark.

2. Description of Related Art

As can be seen by reference to the following U.S. Pat. Nos. 3,871,336, 4,909,189, 5,140,946, 5,370,082, 6,055,942 and 6,494,040, these prior art pet collar constructions are adequate for the basic purpose and function for which they have been specifically designed, but they are uniformly deficient with respect to their failure to provide a simple, efficient, and practical pet strap that glows in the dark.

As a consequence of the foregoing situation, there has existed a longstanding need for a new and improved pet strap and the provision of such a construction is a stated objective of the present invention.

BRIEF SUMMARY OF THE INVENTION

Briefly stated, the present invention provides a pet strap formed of a transparent material, such as plastic or synthetic rubber, with photoluminescent or phosphorescent colored pigment homogeneously dispersed within and incorporated into the elastometric material. The preferred photoluminescent is strontium oxide aluminate or strontium barium aluminate, which emit a yellow-green light. The strap may be disposed to encircle the neck of the pet as a conventional collar with a buckle and strap end retainers. The strap may also be made in various dimensions suitable for pets of all sizes, and may be configured to be trimmed to the desired size. Another embodiment of the pet strap includes a light reversion strip and an underlying or encased fabric reinforcing strip encased within the elastomeric strap adjacent the bottom side of the strap that contacts the pet. The light reversion strip will allow available light to charge the luminescents more proficiently for better performance.

BRIEF DESCRIPTION OF THE SEVERAL VIEWS OF THE DRAWINGS

These and other attributes of the invention will become more clear upon a thorough study of the following description of the invention, particularly when reviewed in conjunction with the drawings, wherein:

FIG. 4 is a perspective view of a dog collar with an attached leash, illustrating an end portion of the collar being trimmed to size;

FIG. 5 is a partial exploded perspective view showing the attachment of the buckle by a rivet pin to one end of the strap;

FIG. 6 is a partial perspective view showing a ring on the strap end retainer attached to a leash;

DETAILED DESCRIPTION OF THE INVENTION

Figure 1:
FIG. 1 is a perspective view showing the glow in the dark pet strap of the present invention in the form of a collar for a dog.
Figure 2:
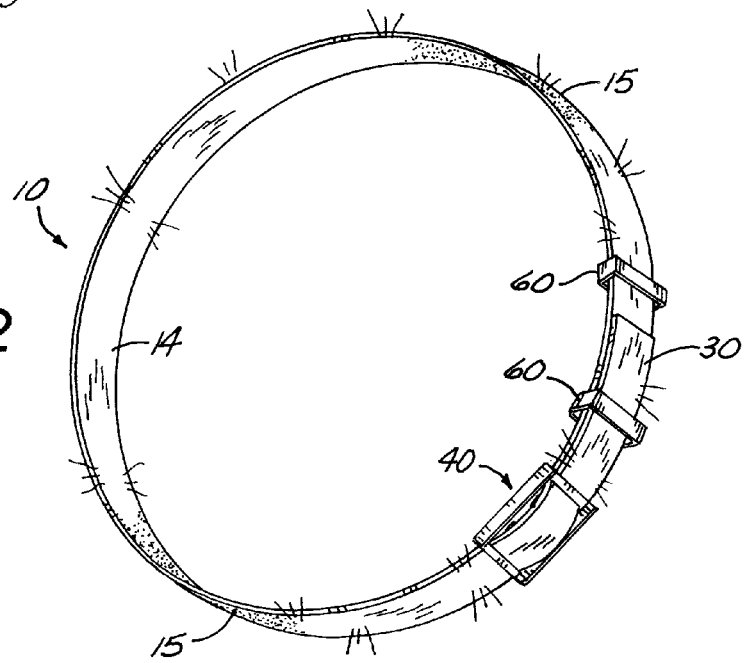
FIG. 2 is an enlarged perspective view of the collar.
Figure 3:
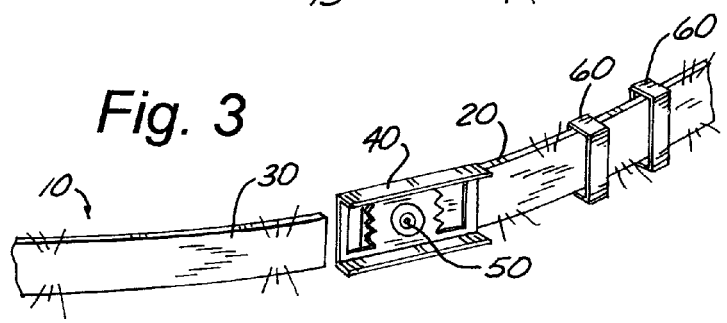
FIG. 3 is a partial perspective view thereof.
Figure 7:
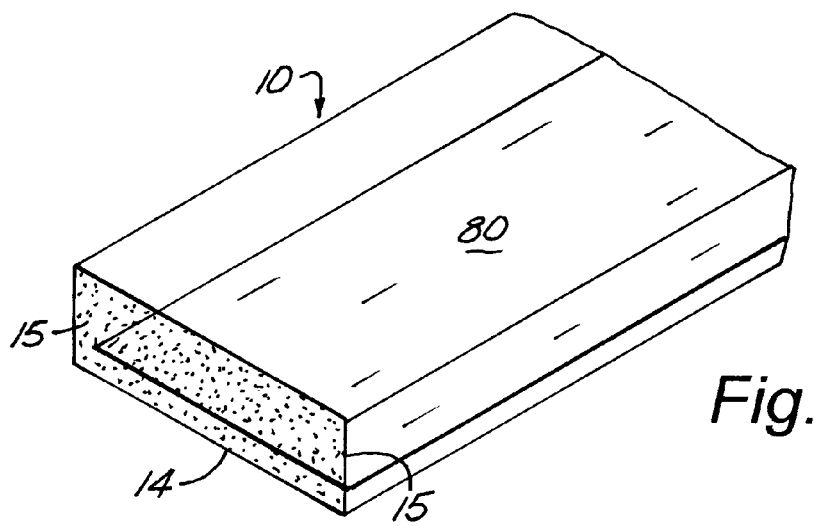
FIG. 7 is a cutaway perspective view of a section of the strap with a light reversion strip encased within the body of the strap.
Figure 8:
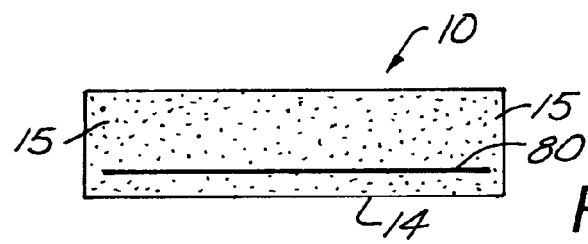
FIG. 8 is a sectional view showing the location of the light reversion strip encased within the strap.
Figure 9:
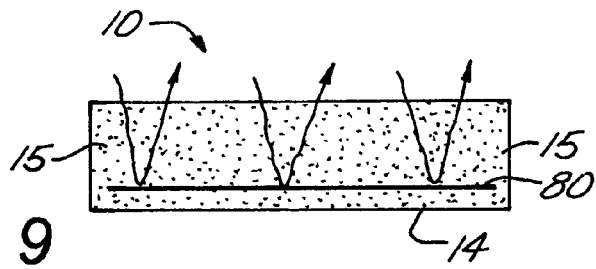
FIG. 9 is a view similar to FIG. 8, but showing the light rays reflecting back through the body of the strap from the light reversion strip.
Figure 10:
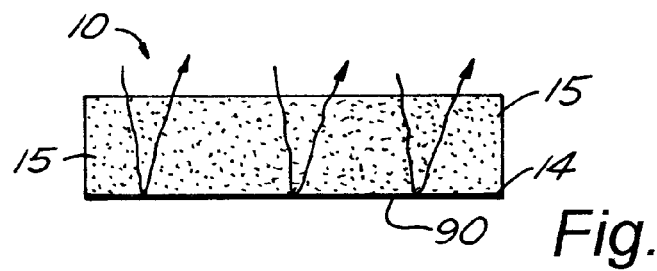
FIG. 10 is a view similar to FIG. 9, but showing an embodiment of the pet strap where the reversion strip is attached to the outside of the strap that contacts the pet.
Figure 11:
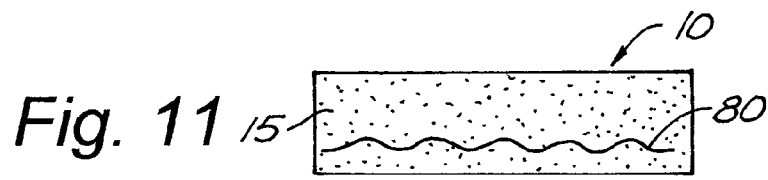
FIGS. 11 through 16 are sectional views showing light reversion strips having various possible shapes.
Figure 12:
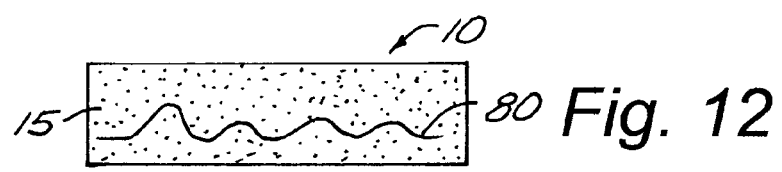
Figure 13:
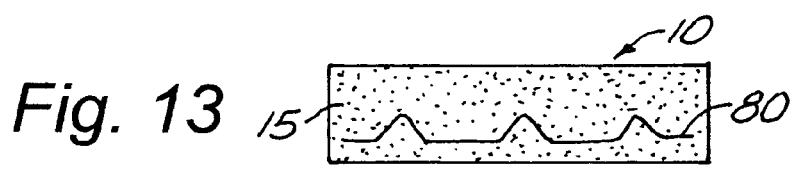
Figure 14:
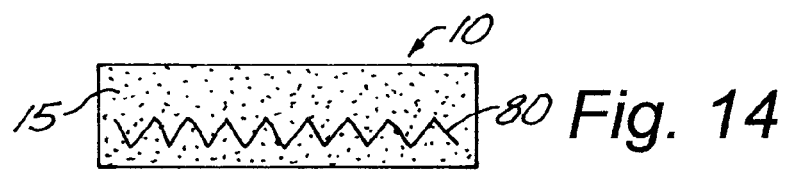
Figure 15:
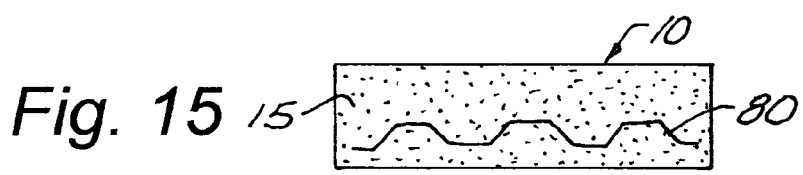
Figure 16:
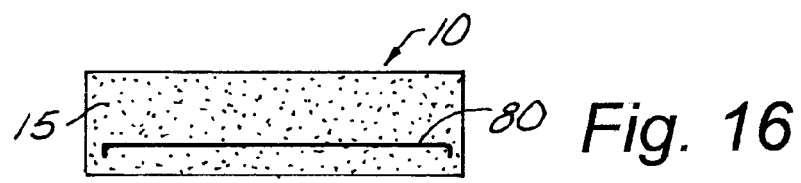
Figure 17:
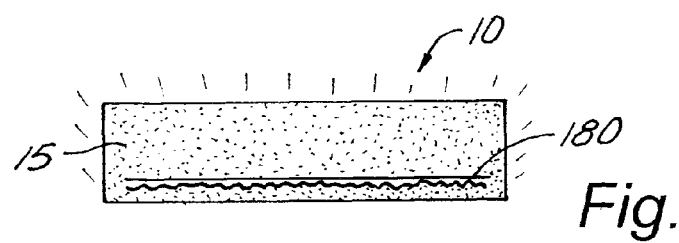
FIG. 17 is a sectional view showing the reversion strip adjacent the bottom side of the strap with an underlying fabric reinforcing strip.

As can be seen by reference to the drawings, and in particular to FIG. 1, a glow in the dark pet strap that forms the basis of the present invention is designated generally by the reference number (10).

The strap (10) illustrated in the drawings is in the form of a pet collar having a first end (20) and second end (30). The first end (20) has a buckle (40) attached by a rivet pin (50). A pair of strap end retainers (60) are slidably received on the strap (10) and secure the portion of the second end (30) of the strap (10) that extends beyond the buckle (40). A ring (70) is attached to one of the strap end retainers (60) for attachment of a leash or an identification tag.

The strap (10) may be formed as a continuous loop with flexible properties to encircle the pet's feet, tail, torso, or neck. In the preferred embodiment, the strap (10) encircles the pet's neck as does a conventional collar. The strap (10) can also be of various dimensions to be used with pets of all sizes. For example, when used as a collar for smaller animals, the preferred dimensions are ⅛" thick×7/16" wide×20" long, and for larger animals the dimension of ⅛" thick×⅞" wide×20" long is preferred. It is possible to add two or more straps (10) together end-to-end for the largest pets. The length of the strap (10) may be trimmed or cut to fit the desired length for an individual pet if the end of the strap is overly long after the collar is cinched up to the desired fit for the pet, as shown in FIG. 4.

The slipless buckle (40), rivet pins (50), strap end retainers (60), and ring strap end receiver (70) may be made of suitable strong material such as metal and/or high quality plastic.

Figure 19:
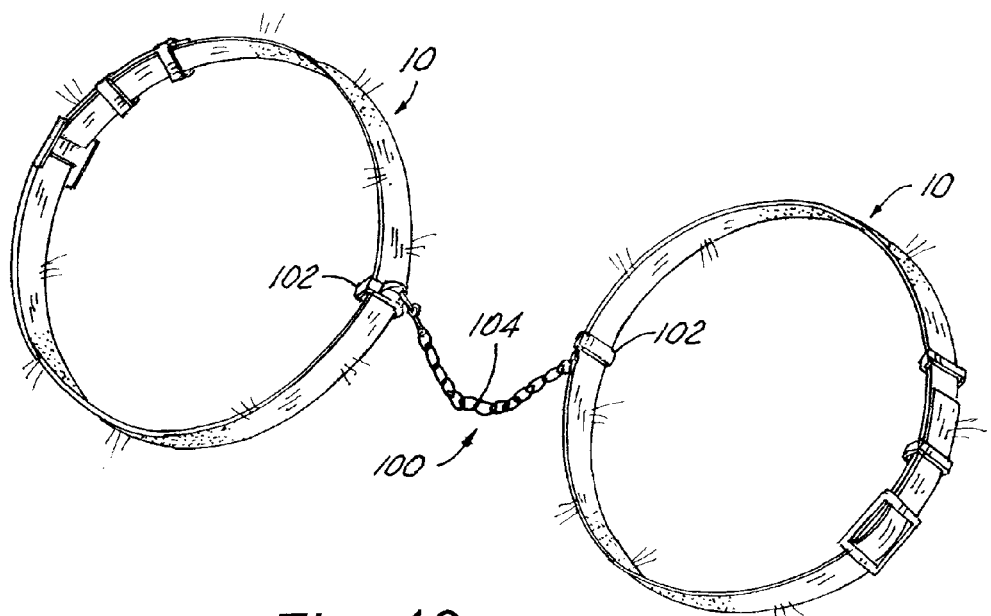
FIG. 19 is a perspective view showing two collars connected with a collar-to-collar fastener chain.
Figure 20:
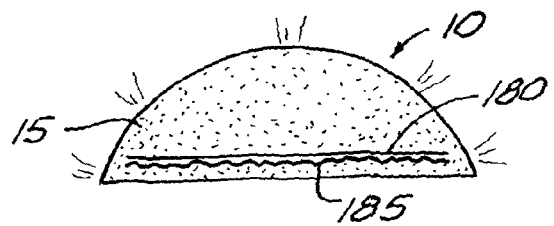
FIGS. 20 through 24 are sectional views showing straps of various shapes.
Figure 21:
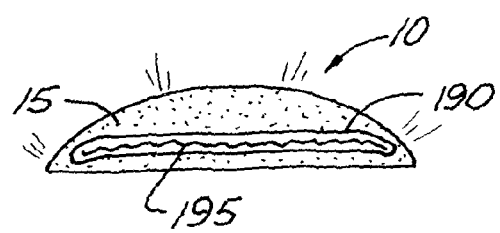
Figure 22:
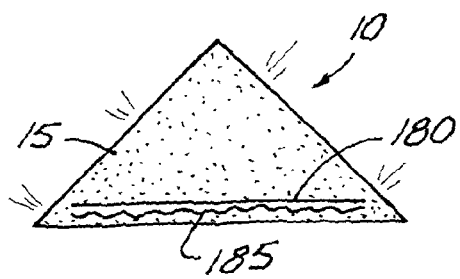
Figure 23:
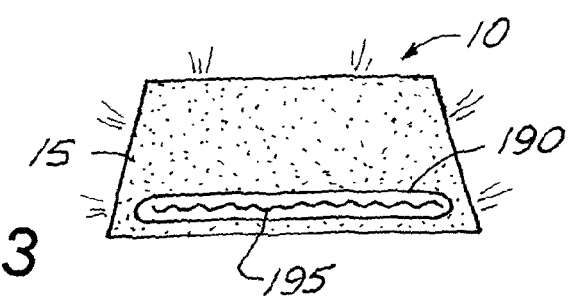
Figure 24:
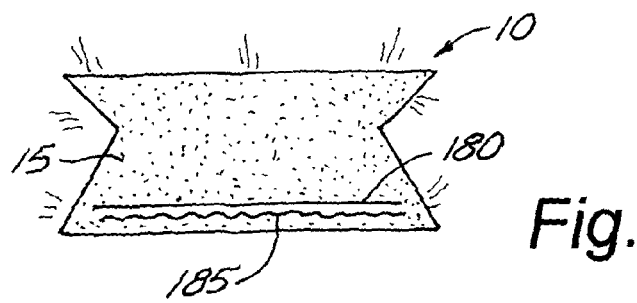

It is preferred that the formulated collar strap material be non-toxic, flexible but firm, have good tensile strength, be resistant to sunlight, oils and dirt, be resistant to hardening or becoming brittle, and be clear or transparent. The collar may be used with a leash, when made of sufficient strength. A leash may be attached to the ring receiver strap retainer (70) so an additional collar would not be required for walking or restraining the pet. FIG. 19 shows a collar-to-collar fastener chain (100) that connects to two collar's leash rings (70). The hook/clamp fasteners (102) have a number of links (104) between the two ends to allow space or slack between the two collars, the fastener chain (100) connects to the base collar which is normally a semi-snug fit. The second end of the clamp fastener (100) is connected to the loose fit glow-in-the-dark collar. This two clamp fastener (100) with a spacer chain is to stop a loose glow-in-the-dark collar from being so loose with slack that it could fall off. This collar-to-collar clamp with links of spacers is to allow the collar to be able to move with the movement of the pet. The device is for pets whom the cutting/trimming of their hair/fur is not wanted or desired, allowing better conditions for the collar to stay on and move, allowing the collar to be visible by sight and be more in view of the light to "charge" the collar. The fastener chain (100) may be made in two sizes—a larger size for larger size collars, and a smaller size for smaller size collars. The chain (100) will give the glow-in-the-dark pet strap (10) better conditions to glow in the dark and charge with light when worn loose connected to the base collar. Between the two clamping devices (102) there are a number of metallic or plastic chain links (100) to allow slack for the glow collar to move around, providing conditions for the collar to possibly stay on or above the hair/fur of the pet. To better allow the collar to be more exposed to light to "charge" and to be visible by sight of persons and if conditions allow, a visible emitting glow from the collar. The material between the two metal or plastic clamping devices may include: metallic, plastic, thin flexible metal cable, nylon or fabric materials, rope, etc.

As used herein, the following terms will have the meanings as shown.

Luminesce: to be or become luminescent
Luminescence: emission of light (phosphorescence or fluorescence)
Luminosity: the condition or quality of being luminous
Luminous: emitting light (especially self-generated light)
Luminescent: phosphorescent or photoluminescent
Luminous producer: phosphorescent or photoluminescents
Plastic—a product of synthetic chemistry; acrylic, vinyl and styrene are transparent plastics
Synthetic rubber: in general, has greater resistance to deterioration from oil, other solvents, sunlight and heat (and is less permeable)
Permeable: capable of being passed through or penetrated The luminous portion for the strap (10) may be provided via any suitable luminescent producing material. One embodiment is a strap formed of a plastic transparent material having about thirty weight percent of an added photoluminescent pigment (15) homogeneously incorporated into the translucent material that form the strap (10). The photoluminescent with color pigment particles may be strontium oxide aluminate or strontium barium aluminate that emits a yellow-green light which is believed to be among the brightest colors. It is to be understood that other pigments that emit over ten different colors may also be used. An appropriate amount of photoluminescents, —(powder or liquid form), is used in relation to the weight percent of the collar strap material, to produce the "glow" intensity and glow duration desired.

The collar strap's luminosity is produced with added phosphorescence or photoluminescence with color pigment. Phosphorescence with color pigment is a zinc, sulfide, copper compound. It is a slower emitter of light having a longer glow duration, and may be less bright than other luminescents.

The collar strap material may be transparent synthetic rubber with added luminescent and color pigment. Synthetic rubber used for its elastomeric properties and resistance to deterioration from oil, solvents, sunlight, heat and is less permeable. A recommended 30 weight percentage of luminescence with color pigment is added to the collar strap material during formation of the strap. This weight percentage will yield above minimum to maximum performance of light absorption and with glow duration and intensity.

Figure 18:
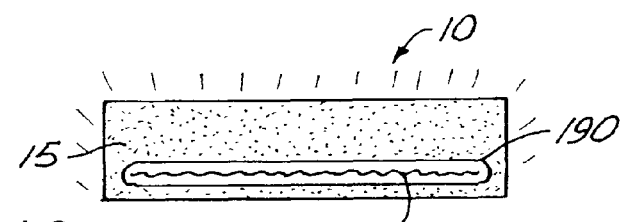
FIG. 18 is a sectional view showing the reversion strip adjacent the bottom side of the strap with a fabric reinforcing strip encased within the reversion strip.

Other embodiments of the present invention are shown in FIGS. 7-10 and 17-18, wherein a light reversion strip (80) is encased within the strap (10) at the time of molding or casting (FIGS. 7-9); a light reversion strip (90) is attached to the underside (14) of the strap (10) that comes in contact with the pet (FIG. 10); the light reversion strip (180) is encased within the strap (10) adjacent to the underside (14) with an underlying fabric reinforcing strip (185) (FIG. 17); or the light reversion strip (190) is encased within the strap (10) and the strip (190) itself encases a fabric reinforcing strip (195) (FIG. 18). These embodiments make the most of the available light by exposing the photoluminescent or phosphorescent particles (15) to light reflected from the strips (80), (90), (180) and (190). and passing back through the luminescent particles (15) to give them a second charge. Also, light emitted from the luminescent particles (15) will reflect back from the strips (80), (90), (180) or (190) to allow a longer glowing duration and intensity.

The reversion strips (80), (90), (180) or (190) extend the full length of the strap (10). Where the strip (80), (180) or (190) is encased within the strap (10) (FIGS. 7-9 and FIGS. 17-18), the strip (80), (180) or (190) is protected on both sides and its edges. Where the light reversion strip (90) is applied to the back side of the strap (10), an anti-wear protective coating, such as the material used to make the strap, may be applied to prevent outer wear of the light reversion strip (90).

The preferred reversion strips (80), (90), (180) or (190) are a thin non-metallic, smooth textured surface, pliable, flexible material with highly reflective properties similar to foil. The strips may be made in different widths and shapes to aid the luminescent particles (15) in different applications for absorbing and reflecting light at different angles (FIGS. 11-16). The preferred width is only slightly less than the width of the strap (10) to protect the light reversion strip from outer wear. The strap (10) itself may be made in various shapes as illustrated in FIGS. 20-24. The characteristics of the woven fabric strip (185) and (195) must include flexibility to allow bending and tensile strength to allow large pulling forces.

As shown in FIG. 18, a thin woven and tension resistant fabric strip (195) is enclosed with a covering layer to be formed into shape. The formulated light reverting materials (190) enclose the woven fabric (195) in a pre-shaped design and size, providing a light reverting strip (190) with greater tensile strength. The light reverting material is applied in a thick layer to the front and back of the reinforcing strip (195) to provide the most resistance to cracking or tearing under tension.

When the glow in the dark pet strap is exposed to light, the photoluminescents or phosphorescent will charge in intensity to the given light present. If suddenly removed from light to a less prevalent light, the pet strap will emit light greater than the given light. This will allow the pet to be seen or located in the darker setting. With minimum light available to charge the pet strap, the reversion strip will allow a more intense charge by reflecting given light back through the luminescent particles a second time, thus allowing a better charge with lesser light available. The collar, when worn by the pet, is preferably unobstructed in view of the light with the pet's fur or the presence of another collar.

The collar strap will "charge" in artificial or natural light with light photons. The collar's phosphorescent or photoluminescent minerals will absorb and store this energy, through a non-electric, non-heat reaction, then release this energy slowly with light until the "charge" depletes back to neutral.

The clarity of the formulated collar's strap material will be transparent or clear to enable light to shine into the strap providing optimum conditions for the photoluminescents/phosphorescent to absorb light photons and emit light back from within the strap.

A choice of photoluminescence or phosphorescence for the luminescent material and each others use, can be made at the time of manufacture in relation to the cost of the materials, performance and quality of grades of luminescence within formed strap (10).

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

The invention claimed is:

1. A pet strap, comprising:
   a strap disposed to encircle a body part of a pet; and
   the strap being formed of a transparent material having homogeneously incorporated luminescent compounds with color pigment, wherein the strap includes an exterior side directed away from the pet, and an interior side disposed in contact with the pet;
   a light reverting strip disposed adjacent the interior side of the strap and having a top surface in light communication with the exterior side of the strap; and,
   a fabric reinforcing strip disposed to underlie the top surface of the light reverting strip, wherein light entering the exterior side of the strap is reflected back from the top surface of the light reverting strip through the strap to again charge the luminescent particles.

2. The pet strap of claim 1, wherein the strap includes a first end, a second end, and a fastener disposed to interconnect the first and second ends.

3. The pet strap of claim 2, wherein the fastener is a buckle attached to one of the first and second ends of the strap.

4. The pet strap of claim 3, wherein strap end retainers are slidably attached on the strap and disposed to receive another of the first and second ends of the strap to restrain the collar's slack after the collar is cinched up to the desired fit for the pet.

5. The pet strap of claim 4, further including a ring attached to the strap end retainer, the ring being disposed to receive an end of a leash or identification tag.

6. The pet strap of claim 1, wherein the body part is a neck.

7. The pet strap of claim 1, wherein the luminescent compounds are strontium oxide aluminate, strontium barium aluminate or zinc sulfide copper compounds.

8. The pet strap of claim 7, wherein the luminescent compounds with color pigment comprise about thirty weight percent of the strap.

9. The pet strap of claim 1, wherein the luminescent compounds with color pigment comprise about thirty weight percent of the strap.

10. The pet strap of claim 1, wherein the transparent material is translucent plastic.

11. The pet strap of claim 1, wherein the transparent material is synthetic rubber.

12. The pet strap of claim 1, wherein the reverting strip is encased within the strap.

13. The pet strap of claim 1, wherein the reverting strip is attached to the interior underside of the strap.

14. The pet strap of claim 12, wherein the fabric reinforcing strip is encased within the strap.

15. The pet strap of claim 14, wherein the fabric reinforcing strip is encased within the light reverting strip.

16. The pet strap of claim 6, further including a base pet collar disposed to encircle the neck of the pet, spaced from the strap, wherein a loose fit glow-in-the-dark pet strap is connected to a base pet collar by a strap-to-base collar restraining extension (for movement) connector.

\* \* \* \* \*